United States Patent [19]
Harsch

[11] 3,941,901
[45] Mar. 2, 1976

[54] SURFACE ALIGNMENT METHOD FOR LIQUID CRYSTAL CELLS AND PRODUCTION OF POLARIZERS THEREFOR

[75] Inventor: Thomas B. Harsch, Stow, Ohio

[73] Assignee: Hoffmann-La Roche Inc., Nutley, N.J.

[22] Filed: Feb. 15, 1974

[21] Appl. No.: 442,930

[52] U.S. Cl. .......... 427/108; 350/160 LC; 427/163; 427/164; 427/358; 427/359; 428/1
[51] Int. Cl.² .......................................... G02F 1/13
[58] Field of Search ............. 350/160 LC, 150, 155; 264/2; 117/64 R, 218, 111 H; 427/108, 163, 164, 358, 359

[56] References Cited
UNITED STATES PATENTS

| | | |
|---|---|---|
| 3,235,631 | 2/1966 | Shelanski ............................ 264/2 |
| 3,468,700 | 9/1969 | Long ............................. 117/111 H |
| 3,507,682 | 4/1970 | Flavin et al. .................. 117/64 R X |
| 3,731,986 | 5/1973 | Fergason ............................ 350/150 |
| 3,795,516 | 3/1974 | Stahr et al. ..................... 117/218 X |
| 3,809,456 | 5/1974 | Goldmacher et al. ......... 350/160 LC |

*Primary Examiner*—Ralph Husack
*Attorney, Agent, or Firm*—Samuel L. Welt; Bernard S. Leon; Mark L. Hopkins

[57] ABSTRACT

Method for producing homogeneous surface alignment of liquid crystal materials by applying to the surfaces of transparent plates bounding a liquid crystal film a polymer which is subjected to a shear thinning technique to cause elongation and alignment of long chain polymers. In certain embodiments of the invention, the surfaces are coated with a polymer treated with a dichroic dye such that a polarizing film is formed adjacent the liquid crystal film. This eliminates the need for separate polarizers on opposite sides of a liquid crystal display.

10 Claims, 4 Drawing Figures

SURFACE ALIGNMENT METHOD FOR LIQUID CRYSTAL CELLS AND PRODUCTION OF POLARIZERS THEREFOR

BACKGROUND OF THE INVENTION

While not necessarily limited thereto, the present invention is particularly adapted for use in the production of field effect liquid crystal displays of the type shown in U.S. Pat. No. 3,731,986 issued May 8, 1973. The optical display devices shown in that patent convert electrical intelligence into optical images with the use of a field effect shutter device comprising a layer of nematic liquid crystal material sandwiched between opposing parallel plates coated with transparent conducting films. These plates, with the liquid crystal material therebetween, are disposed between and parallel to a pair of polarizers such that when an electrical potential is established across the conducting films and the liquid crystal layer, the device will change from a light transmitting to opaque medium, or vice versa, depending upon the orientation of the two polarizers. By forming the two conducting films in the shape of a desired optical image, that image can be made to appear or disappear, depending upon whether a potential is established between the conducting films. Furthermore, by creating separate conducting areas, as by etching the conducting films, any number of conductive regions can be switched ON while other regions are not affected to produce any one of a number of different images with the same liquid crystal sandwich assembly.

Nematic liquid crystal displays of the type described above depend upon a twisted nematic structure in the liquid crystal film. This is achieved by causing the nematic liquid crystal molecules to align parallel to the two bounding transparent plates, the parallel alignment of the two plates being at right angles to each other. Homogeneous alignment of a liquid crystal to a surface can be achieved by three well-known techniques. In one of these, thin coatings of a long chain polymer are applied to the facing surfaces of the two transparent plates between which the liquid crystal layer is disposed. By subsequently rubbing these coatings with a soft material such as cotton cloth or paper, the molecules on the respective coatings can be made to align at right angles with respect to each other, whereby the liquid crystal molecules adjacent the respective plates will align parallel to the rubbed lines. This technique, however, has several inherent disadvantages. First, the rubbing operation introduces unwanted contamination onto the polymer coatings because the materials which are used to rub the polymer are generally something other than the polymer itself (i.e., cotton or paper). Secondly, the rubbing operation introduces considerable shearing forces on the polymer film and may tear the film away from the substrate during manufacture.

The second known technique utilized to produce homogeneous alignment of a liquid crystal to a surface involves creating unidirectional microgrooves in the two facing transparent plates with a device such as a buffing wheel loaded with a fine abrasive. The substrate is then later coated with a material such as silane to produce the proper surface energy to cause homogeneous alignment.

The third technique, which is similar to the second described above, is to evaporate a silicon oxide film onto the substrate at a low angle, thereby producing microgrooves.

The latter two techniques, while suitable in certain instances, are difficult to implement, involve expensive equipment, and are relatively slow.

SUMMARY OF THE INVENTION

In accordance with the invention, homogeneous alignment of liquid crystal molecules to a surface is achieved by a technique known as shear thinning which is a reversible decrease in viscosity resulting from the tendency of an applied shear force to disturb the long chains of a polymer from their favored equilibrium configuration, causing elongation in the direction of shear.

In carrying out the invention, a substrate such as the bounding transparent plate of a liquid crystal display is initially coated with a mixture of a long chain polymer and a suitable solvent. The polymer must be such as to wet the substrate. While the solution is still wet, homogeneous alignment of the molecular structure can be achieved by spreading the solution onto the surface of the substrate with a squeegee or other device which creates relative motion between itself and the substrate. In this manner, homogeneous alignment of the polymer chains will result in the direction of the relative motion. When the solution dries, the polymer chains maintain the induced alignment such that when a nematic or cholesteric liquid crystal layer is brought into contact with the treated polymer, the liquid crystal molecules will align in the direction of the alignment of molecules in the polymer.

The polymer utilized must comprise a long chain polymer and can be either a water or hydrocarbon soluble resin. Suitable examples include polyvinyl alcohol and polyvinyl butyral. Furthermore, the solution concentration must be high enough such that shear forces are induced in the solution (i.e., polymer and solvent) sufficient to cause homogeneous alignment of the polymer chain. On the other hand, the solution concentration must be low enough such that it will adhere to the substrate and the squeegee or other similar tool even under shear forces.

Further, in accordance with the invention, the film with aligned molecules in contact with the liquid crystal layer can be formed into a polarizer by adding to the polymer, while in solution, a substance such as iodine which will form a dichroic substance incorporated into the polymer. Alternatively, the polymer coating can be stained with iodine. In this manner, external polarizing sheets on opposite sides of the liquid crystal display can be eliminated, the coatings on the interior surfaces of the transparent plates acting both as polarizers and as a means for surface alignment of the liquid crystal layers.

The above and other objects and features of the invention will become apparent from the following detailed description taken in connection with the accompanying drawings which form a part of this specification, and in which.

Figure 1:
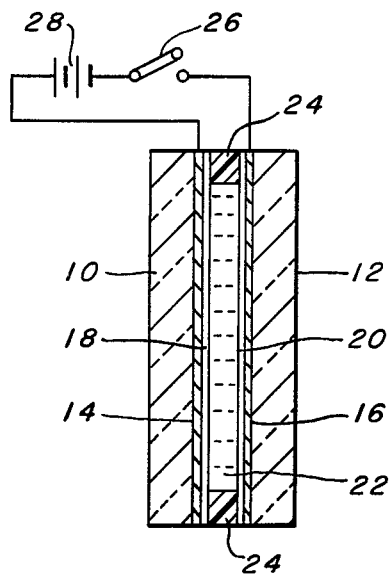
FIG. 1 is a cross-sectional view of a nematic field effect liquid crystal cell which can be fabricated in accordance with the teachings of the invention.

With reference now to the drawings, and particularly to FIG. 1, there is shown a field effect nematic liquid crystal display of the general type shown and described in U.S. Pat. No. 3,731,986 issued May 8, 1973. It comprises a pair of spaced pieces of glass or other similar transparent material 10 and 12. Provided on the facing surfaces of the transparent plates 10 and 12 are coatings 14 and 16 of transparent conductive material, such as tin oxide or indium oxide. Overlying the transparent conductive coatings 14 and 16 are coatings 18 and 20 of the surface treating material of the invention; and between the coatings 18 and 20 is a layer 22 of liquid crystal material. As is more fully described in the aforesaid U.S. Pat. No. 3,731,986, the liquid crystal material 22 is nematic at room temperature and is of positive dielectric anisotropy. Surrounding the layer of liquid crystal material is a suitable gasket 24 which may comprise a thermosetting resin such as that described in copending application Ser. No. 396,789, filed Sept. 13, 1973 now U.S. Pat. No. 3,853,392, issued Dec. 10, 1974. Crossed polarizing films may be provided on the outer surfaces of the transparent plates 10 and 12. However, in accordance with the present invention, it is preferable to form the surface coatings 18 and 20 such that they comprise crossed polarizers in contact with the liquid crystal material.

In the operation of a field effect liquid crystal light shutter, it is necessary that the liquid crystal film 22 have a twisted nematic structure. This can be achieved by rubbing the surfaces in contact with the liquid crystal film unidirectionally at right angles to each other. The molecules in a nematic-phase liquid crystal material are each long and straight, and they tend to lie parallel, like straws in a broom. A property of the nematic-phase material is that the molecules in the vicinity of a rubbed surface tend to align themselves with it. By providing rubbed lines at right angles to each other on the respective facing surfaces bounding the liquid crystal layer, those molecules nearest one bounding surface will have their axes perpendicular to those nearest the other bounding surface with the molecules in-between being twisted. That is, the molecules will be twisted in the absence of an applied electric field across the liquid crystal film. When, however, an electric field is applied across the liquid crystal layer 22 as by closing switch 26 to connect the opposite terminals of battery 28 to the conducting films 14 and 16, the nematic structure will untwist.

By providing crossed polarizers on opposite sides of the liquid crystal layer with a twisted nematic structure, polarized light entering one polarizer will be twisted as it passes through the nematic liquid crystal layer and pass through the other polarizer. However, when an electric field is established between the conducting films 14 and 16 as by closing switch 26 to connect the opposite terminals of battery 28 to the conducting films, the nematic structure will untwist and polarized light will not pass through the cell. In this manner, the cell acts as a light shutter; and by depositing the conductive coatings appropriately an alpha-numeric display can be provided. By using parallel polarizers rather than crossed polarizers, the device will normally block light due to the twisted structure, but will transmit light when an electric field is applied across the liquid crystal film.

In copending application Ser. No. 395,571, filed Sept. 10, 1973, there is described a new and improved display assembly wherein a correct twisted nematic structure is assured by applying a water soluble polymer or a hydrocarbon soluble polymer to the surfaces of the transparent plates prior to unidirectional rubbing. This gives better contrast between the light and dark areas of the liquid crystal display. However, as mentioned above, rubbing has several inherent disadvantages in that it introduces unwanted contaminants into the polymer surface and the rubbing operation introduces considerable shearing forces on the polymer film which may tear the film away from the substrate on which it is deposited.

In accordance with the present invention, therefore, rubbing of the polymeric coatings 18 and 20 is eliminated. It has been found that the molecules in the liquid crystal material will align themselves with the surface of a polymeric substance if the molecules of the polymer are themselves aligned. This can be achieved, and has been achieved, by casting a long chain polymeric sheet and thereafter stretching the sheet. This procedure, however, requires that the sheet be formed as a separate entity and then applied to the substrate with an adhesive. It has been found, however, that by simply depositing the polymer, dissolved in a suitable solvent, on the substrate and thereafter subjecting the polymer to a shear thinning technique, the same desirable effect of aligned long chain polymeric molecules is achieved.

Figure 2:
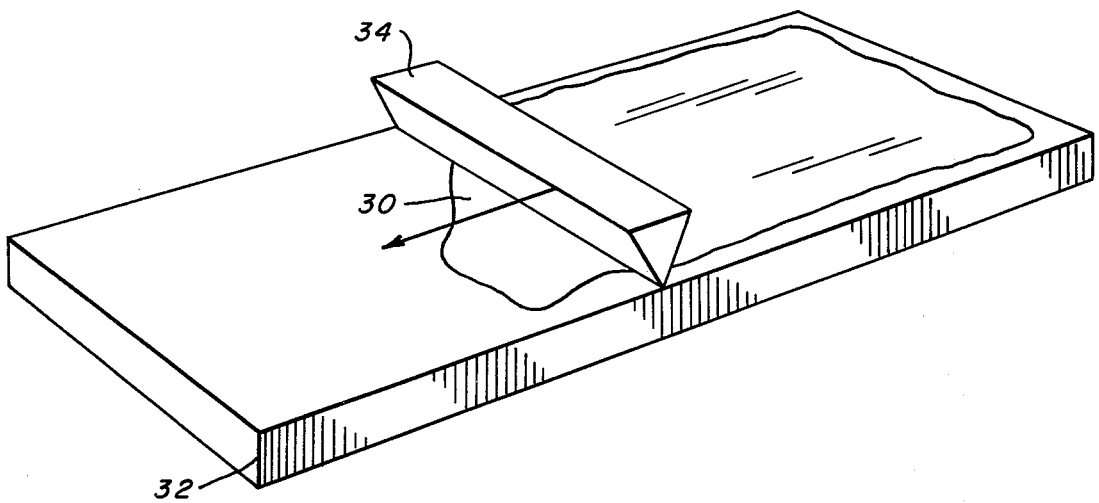
FIG. 2 illustrates one manner in which shear thinning of a polymeric coating can be achieved in accordance with the invention.

One method for producing a shear thinned polymeric coating is shown in FIG. 2 wherein the polymer 30 dissolved in a suitable solvent is simply deposited on a substrate 32 and thereafter wiped onto the surface of the substrate by means of a squeegee 34 or other similar device. As the squeegee passes over the surface of the substrate and thus spreads out the polymer, it subjects the polymer to shear thinning wherein the squeegee passing over the surface of the substrate disturbs the long chains of the polymer from their favored equilibrium configuration, causing elongation in the direction of shear (i.e., the direction of movement of squeegee 34). After the solvent is evaporated, the molecules then remain in positions with their axes aligned such that when the polymeric coating (e.g., coating 18 or 20) comes into contact with the liquid crystal film, the liquid crystal molecules will align with the molecules in the layers 18 and 20 which are at right angles to each other in the specific example given in FIG. 1.

Additionally, by mixing iodine or another suitable material with the polymer and solvent before application to the substrate, or by thereafter staining the polymeric coating with iodine, a dichroic structure is achieved whereby the polymeric coating itself becomes a polarizer. Long chain polymers which have been found suitable for use in the invention include polyvinyl alcohol, polyvinyl butyral, polyvinyl formal, polyvinyl glyoxal and polyvinyl glutoral.

Figure 3:
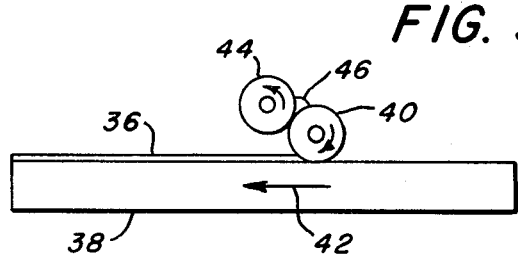
FIG. 3 illustrates another method in which shear thinning can be achieved.

In FIG. 3, another embodiment of the invention is shown wherein a layer of a long chain polymer 36 is applied to a substrate 38 by means of a roll 40 which rotates in a direction opposite to the movement of the substrate 38, indicated by the arrow 42. An inking roll 44 is in contact with roll 40 such that a supply 46 of the solvent-polymer mixture may be disposed in the crevice between the rolls and automatically applied to the periphery of the roll 40 during the application procedure. The roll 40 stretches the layer 36, thereby producing the shear thinning effect and alignment of molecules.

Figure 4:
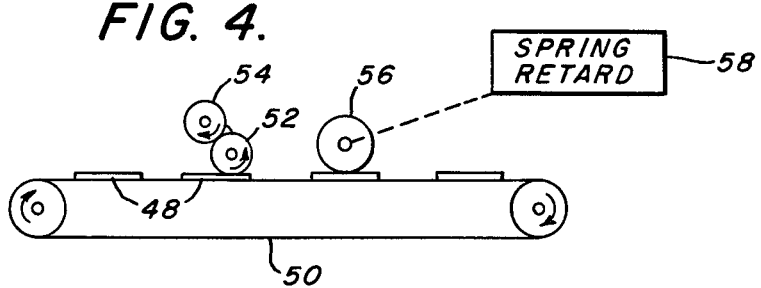
FIG. 4 illustrates still another method whereby shear thinning of a polymeric coating can be achieved on a mass production basis.

In FIG. 4, still another embodiment of the invention is shown wherein a plurality of transparent plates 48 is positioned on a conveyor 50, the arrangement being such that each plate 48 will pass under a roll 52 similar to roll 40 shown in FIG. 3. That is, the roll 52 is provided with an inking roll 54. After passing under the roll 52 and having a film of the polymer applied thereto, successive ones of the plates 48 pass beneath a roll 56 connected to a spring retard device 58 or the like such that as each plate passes beneath the roll 56, a rubbing action occurs which stretches the still-wet film, producing the required shear thinning. It will be apparent, of course, that other and different methods may be employed to produce the required shear thinning step in accordance with the invention.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method for aligning a long chain vinyl polymeric surface for subsequent homogeneous orientation of liquid crystal molecules, which comprises dissolving the long chain polymer in a solvent, applying the solution of the polymer and solvent to a substrate, subjecting the thus-applied polymer to shear forces to effect shear thinning and alignment of the long chain polymer molecules, and evaporating said solvent from the long chain polymer, leaving the long chain molecules aligned.

2. The method of claim 1 wherein said shear forces are created by passing a squeegee over the solution after it is applied to the substrate.

3. The method of claim 1 wherein said shear forces are created by passing a substrate with the solution applied thereto under a roll having a different tangential speed than the lineal speed of the substrate.

4. The method of claim 1 including the step of incorporating into said polymer a dichroic substance whereby the polymer coating becomes a polarizer.

5. In the method for forming a liquid crystal cell from transparent parallel plates having transparent conductive material on the facing surfaces thereof, the steps of dissolving a long chain vinyl polymer in a solvent, applying the solution of the long chain polymer and solvent to the surfaces of said transparent plates onto which the conductive material has been previously deposited, subjecting the thus-applied polymer on the respective plates to shear forces to effect alignment of the long chain polymer molecules, causing said solvent to evaporate, and depositing a layer of liquid crystal material between said plates and in contact with the thus-applied polymer coating.

6. The method of claim 5 including the step of arranging said plates with the liquid crystal therebetween such that the molecular alignments on the respective plates are at right angles to each other.

7. The method of claim 5 including the step of incorporating into said polymer coatings a dichroic substance to form polarizers.

8. The method of claim 5 including arranging said parallel plates to have the respective alignments of the polymer molecules forming an angle relative to one another, thereby effecting a twisted liquid crystal structure.

9. The method of claim 8 including providing a nematic liquid crystal having positive dielectric anisotropy between the plates.

10. A method according to claim 1 wherein selection of said polymer is made from the group consisting of polyvinyl alcohol, polyvinyl butyral, polyvinyl formal, polyvinyl glyoxal and polyvinyl glutaral.

* * * * *